C. JERABEK.

AUTO TIRE TUBE CARRIER.

APPLICATION FILED FEB. 10, 1922.

Reissued June 13, 1922.

15,383

3 SHEETS—SHEET 1.

Inventor.
Charles Jerabek.
by his Attorneys.
Howson & Howson

C. JERABEK.

AUTO TIRE TUBE CARRIER.

APPLICATION FILED FEB. 10, 1922.

Reissued June 13, 1922. 15,383.

3 SHEETS—SHEET 2.

Inventor—
Charles Jerabek.
by his Attorneys.
Howson & Howson

C. JERABEK.
AUTO TIRE TUBE CARRIER.
APPLICATION FILED FEB. 10, 1922.
Reissued June 13, 1922. 15,383.
3 SHEETS—SHEET 3.
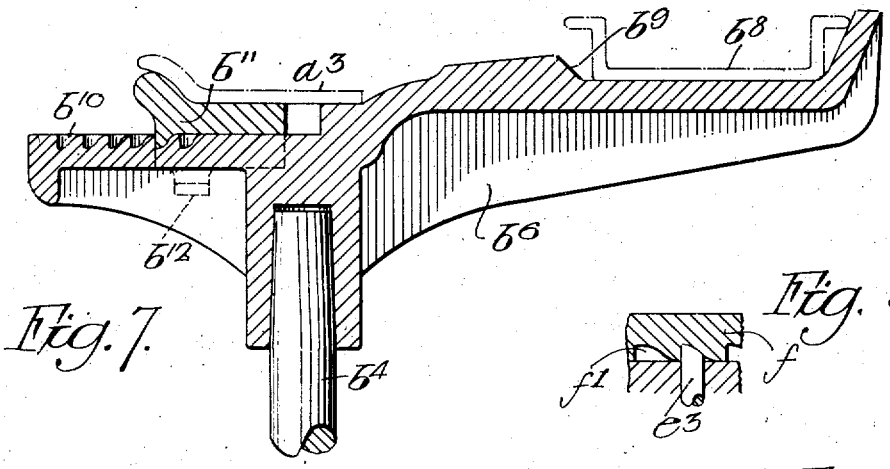
Fig. 7.
Fig. 9.
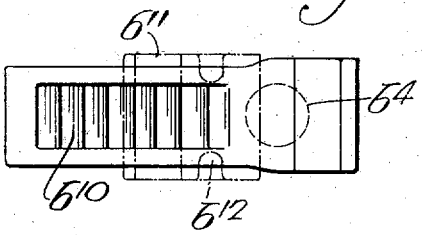
Fig. 10.
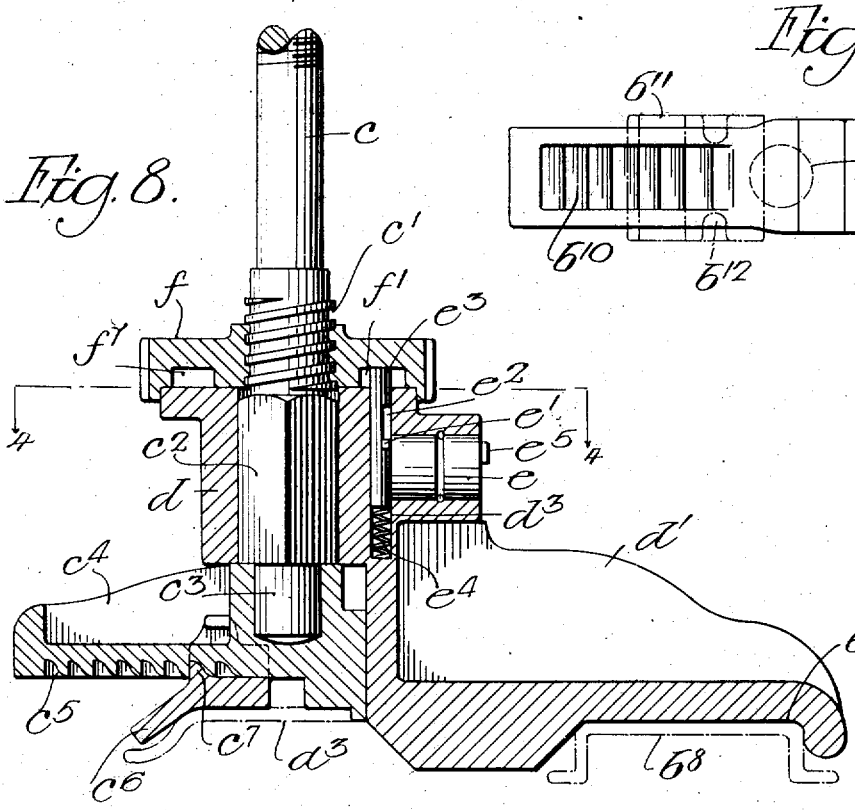
Fig. 8.
Inventor:
Charles Jerabek.
by his Attorneys
Howson & Howson

UNITED STATES PATENT OFFICE.

CHARLES JERABEK, OF PHILADELPHIA, PENNSYLVANIA, ASSIGNOR TO LOUIS ROTHSCHILD, OF PHILADELPHIA, PENNSYLVANIA.

AUTO-TIRE-TUBE CARRIER.

15,383. Specification of Reissued Letters Patent. Reissued June 13, 1922.

Original No. 1,351,517, dated August 31, 1920, Serial No. 352,676, filed January 20, 1920. Application for reissue filed February 10, 1922. Serial No. 535,648.

*To all whom it may concern:*

Be it known that I, CHARLES JERABEK, a citizen of the United States, residing in the city and county of Philadelphia, State of Pennsylvania, have invented certain new and useful Improvements in Auto-Tire-Tube Carriers, of which the following is a specification.

My invention relates to a device which is supported from a motor car for clenchingly holding a series of tire-tubes against unauthorized detachment, but not so as to prevent their ready removal when required for use; and in such connection my invention relates to the structural arrangement of the carrier for the defined purpose.

The principal objects of my invention, are first, to provide a tire-tube carrier of simplified construction which is comparatively economical to manufacture and is easily assembled and manipulated for lockingly holding a plurality of tire-tubes in rims of the carrier therefor; and the members of the carrier readily adjustable for clenchingly holding the tire-tubes in locked condition against unauthorized demountability, yet not so as to prevent quick removal when required, for use; and second, to provide a tire-tube carrier so arranged as to be readily adapted to rims of different dimensions for complemental size tire-tubes in providing an all around tire tube carrier for application to any of the many different makes of motor vehicles.

The nature, characteristic features and scope of my present invention, will be more fully understood from the following description taken in connection with the accompanying drawings forming part hereof, in which—

Fig. 7 is an enlarged view partly in section and partly in side elevation of one of the fixed shoe members of the device, showing the right hand recessed part of the said member formed for reception of a tire-tube flanged rim, and the left hand ratcheted surface member provided with a shiftable toothed foot for providing a variable recess for reception of a tire-tube rim.

Fig. 8 is an enlarged broken sectional view partly in side elevation, showing the vertical spindle having threaded and hexagonal-shaped portions and a shoe provided with a ratcheted surface and toothed foot for the reception of different size tire-tube rims, and with a sleeve having as a part a locking-means and recessed shoe, and also showing the notched ring as part of the locking-means of the said device.

Fig. 9 is an enlarged fragmentary sectional detailed view, showing the form of notches of the locking-means and the plunger tongue of the said means to engage in a notch of said means; the said view disclosing in one direction that the said tongue may be turned from notch to notch without affecting the locking effect of the said device; and Fig. 10 is an enlarged underneath plan view of the left hand shoe of the device of Figs. 7 or 8, showing the shiftable foot with overlapping lips for engaging the shoe surfaces on both sides and thereby holding in any required shiftable position the foot in engagement with the ratcheted surface of the said shoe member.

Figure 2:
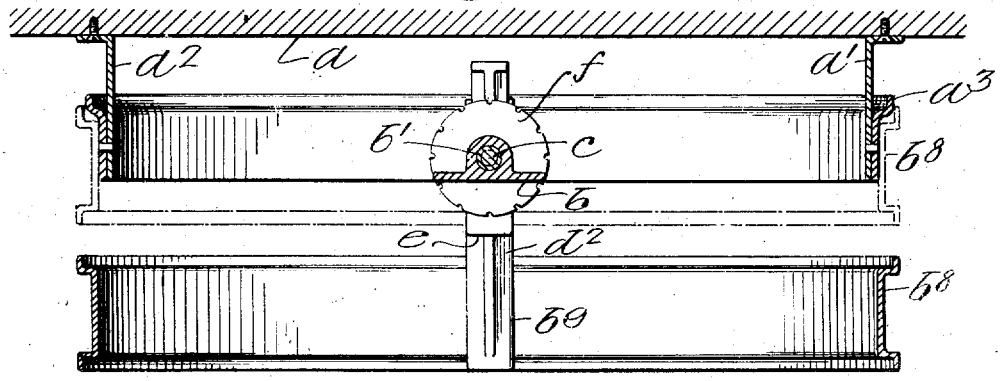
Figure 2 is a horizontal sectional view on the line 2—2 of Fig. 1.
Figure 3:
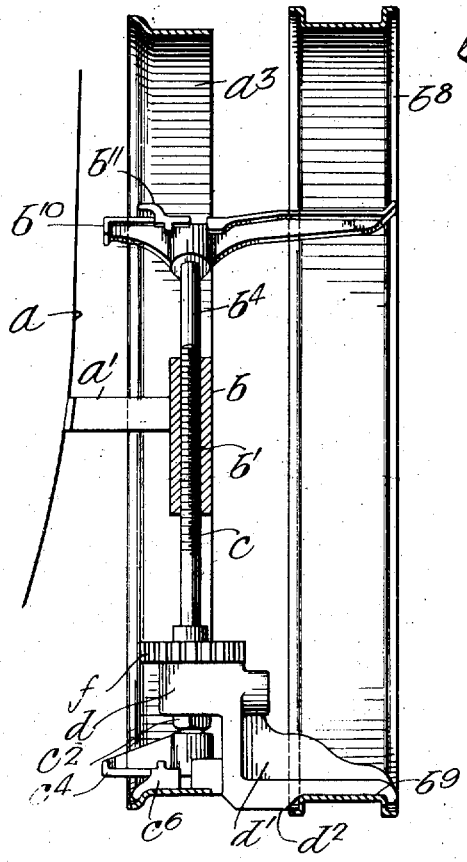
Fig. 3 is a vertical sectional view on the line 3—3 of Fig. 1.

Referring to the drawings *a*, represents the back of a motor car-body from which extend brackets $a^1$ and $a^2$, Figs. 2 and 3, to which a flanged rim $a^3$ is suitably secured.

The tire-tube device of my invention is applied as hereinafter fully explained.

Figure 6:
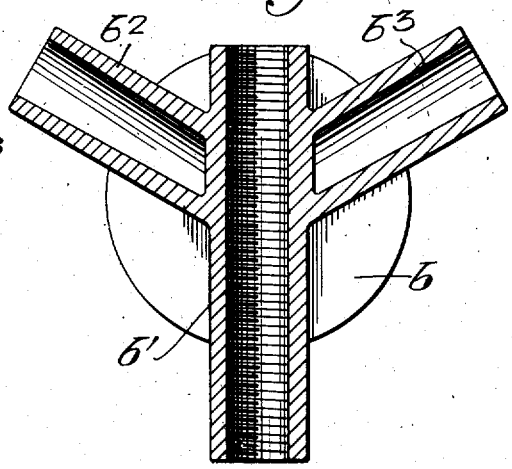
Fig. 6 is a vertical central sectional view of the yoke of the carrier device, showing the threaded bore for the vertical spindle to engage and flaring bearing pockets for housing the spindles of the fixed shoe members of the said carrier device.
Figure 5:
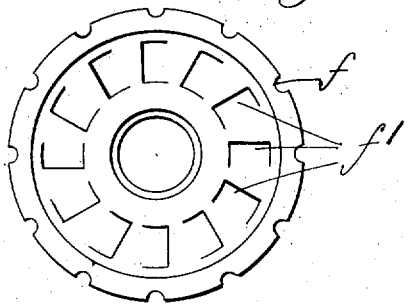
Fig. 5 is an underneath plan view of the notched ring forming part of the locking means of the carrier.
Figure 4:
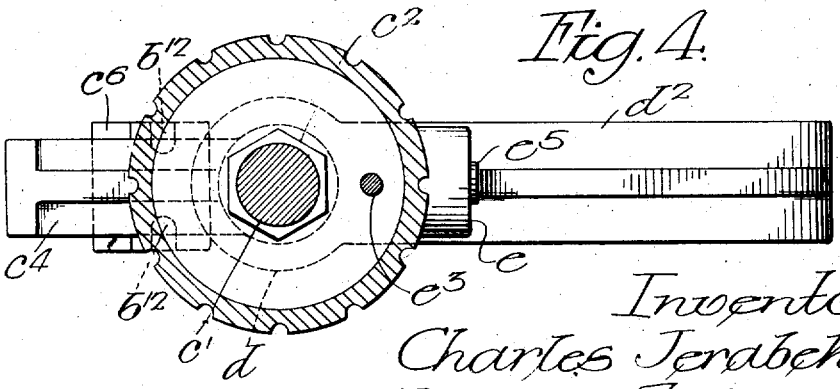
Fig. 4 is an enlarged horizontal sectional elevation on the line 4—4 of Fig. 3, showing the hexagonal portion of the vertical spindle, having a fixed shoe as part thereof and with a shiftable foot and the movable recessed shoe as part of a sleeve turnable on the said spindle and the plunger tongue of the locking-means mounted in the said sleeve.

This device consists of a yoke $b$, having a threaded bore $b^1$, and two flaring bearing pockets $b^2$ and $b^3$, as clearly shown in Fig. 6. Into these bearing pockets are fitted spindles $b^4$ and $b^5$, provided at the outer ends with clamping shoes $b^6$ and $b^7$, for engaging tire rims $a^3$ and $b^8$. These shoes are respectively provided on one side, the right hand one, with a recess $b^9$, for the reception of a tire-tube, and the other side has formed in one surface a ratchet $b^{10}$, and is provided with a shiftable toothed foot $b^{11}$, having overlapping lips $b^{12}$, to engage both sides of the shoe and thus form a means to permit of the ready shifting of the foot along the ratcheted surface of the said shoe and into a position to form a recess of varying length to suit a tire rim as $a^3$, of any required size for thereby holding a tire-tube not shown, in a locked position thereon and as will be hereinafter more fully explained.

Figure 1:
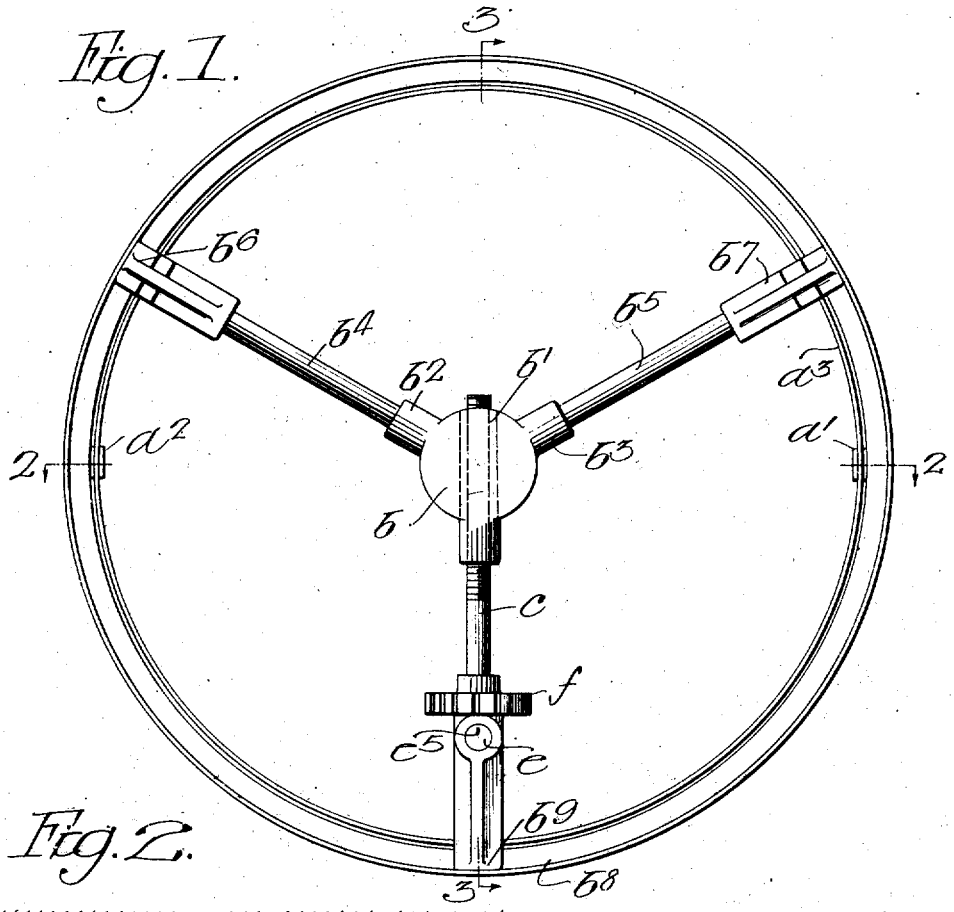
Figure 1 is a front elevation view of an auto tire-tube carrier, embodying the particular main features of my invention.

Through the threaded bore $b^1$, of the yoke $b$, engages a vertical spindle $c$, as clearly shown in Figs. 1 and 3. This spindle $c$, is formed in the lower portion with an enlarged threaded surface $c^1$, and with a hexagonal-shaped portion $c^2$, having a terminal bearing $c^3$, as shown in Fig. 8, which engages a shoe $c^4$. This shoe is provided with a ratcheted surface $c^5$, with which engage the teeth $c^7$, of a foot $c^6$, Fig. 8, to provide one of the recessed shoes for reception and holding in place of one of the tire rims as $a^3$, in Figs. 2 and 8.

A sleeve $d$, is slidably mounted on the spindle $c$, so as to engage the hexagonal-shaped portion $c^2$, of the said spindle. This sleeve is provided with a recessed shoe $d^1$, Fig. 8, for reception of a tire rim as $b^8$. The extension of the sleeve $d$, in that part forming the body of the recessed shoe $d^1$, is provided with a locking-means $e$, of the "Yale" or other type. In the sleeve body $d^1$, as clearly illustrated in Fig. 8, is provided a tongue $e^1$, shiftably engaging the slot $e^2$, of a vertically arranged plunger $e^3$, held in position in the slotted chamber $d^3$, of the sleeve body $d^1$, by means of a helical spring $e^4$, holding normally the plunger $e^3$, in the notch of a recessed ring $f$. The notch formation $f^1$, of this ring is arranged preferably as shown in Figs. 8 and 9, and so as to permit of the turning while engaged by the plunger $e^3$, in one direction without affecting the locked relationship between the ring $f$, and the sleeve $d$, and at the same time not to permit in such condition of unwinding of the said ring on the threaded portion $c^1$, of the spindle $c$, until the plunger $e^3$ is released from the said ring $f$. To release a tire-tube, not shown, from one of the rims as $b^8$, the lock $e$, by means of a key inserted in the slot $e^5$, is turned to cause the tongue $e^1$, in the position shown in Fig. 8, to depress the plunger $e^3$, so as to compress the spring $e^4$, by which it is held in normal position, whereby the ring $f$, can then be turned on the threaded portion $c^1$, of the spindle $c$, to permit the sleeve $d$ with its shoe $d^1$, to be moved relatively to the shoe $c^4$ by being elevated on the portion $c^2$, of the spindle $c$, and thus the rim $b^8$, of a tire-tube held thereon to be readily removed without interference with the relatively stationary shoe $c^4$ which engages the flanged rim permanently fixed to the motor car body, so as to cooperate with the shoes on the spindles $b^4$ and $b^5$ in supporting the tire carrier. The reverse mode of operation as hereinabove described of the said members will restore a tire-tube to the carrying rim $b^8$, for safe holding from the back of a motor car and against unauthorized removal until required to be again released for the desired purpose.

Having thus described the nature and object of my invention, what I claim as new and desire to secure by Letters Patent is:—

1. An auto tire-tube carrier, comprising a yoke having shoes, each having a recess in one part and in the other a shiftable foot, for clenchingly engaging a rim of a tire-tube, a spindle engaging said yoke and provided with threaded and unthreaded portions and having a shoe with a shiftable foot, a sleeve mounted on said spindle and having a recessed shoe, a locking-means provided with a plunger and a notched ring threading with said spindle and arranged to permit the plunger of said means to engage a notch of said ring, substantially as and for the purposes described.

2. An auto tire-tube carrier, comprising a yoke having shoes, each having a recess in one part and in the other a shiftable foot for clenchingly engaging the rim of a tire-tube, a spindle threaded to said yoke having a hexagonal-shaped portion, a sleeve for engaging the hexagonal portion of said spindle provided with a locking-means having a spring actuated plunger and a notched ring for engaging the plunger of said means, substantially as and for the purposes described.

3. An auto tire-tube carrier, comprising a yoke having shoes, one recessed and the other having a shiftable foot for clenchingly engaging a tire-tube rim, a spindle threaded with said yoke, a sleeve arranged to engage said spindle and provided with a locking-means having a spring actuated plunger, a notched ring threading with said spindle and arranged to permit of said plunger being engaged in a notch of said ring and the said sleeve provided with a recessed shoe for a tire-tube rim, substantially as and for the purposes described.

4. An auto tire-tube carrier, comprising a yoke supporting the spindles of recessed shoes connected therewith, said yoke having a vertical spindle threaded thereto and having an unthreaded portion and a shoe having a shiftable foot, a sleeve slidable on said spindle and arranged to lockingly engage the unthreaded portion of said spindle, said sleeve provided with a locking-means having a spring actuated plunger, a notched ring mounted on said spindle and arranged to permit of said plunger engaging a notch of said ring, substantially as and for the purposes described.

5. An auto tire-tube carrier comprising a yoke; members projecting from the yoke; rim engaging shoes for said members; a sleeve slidable but non-rotatably mounted on one of the members; a shoe rigidly connected with said sleeve; and locking means including an element rotatably mounted on said member for normally preventing sliding of the sleeve on its member.

6. An auto tire-tube carrier comprising a yoke having rim-engaging shoes; a member connected to said yoke; a sleeve on said member; locking means on said sleeve; a sleeve retaining element threaded on the member and normally held from movement by the locking means; with a rim-engaging shoe for the sleeve.

7. An auto tire-tube carrier comprising a yoke having shoes for engagement with at least one tire tube rim; a member connected to said yoke having a portion of polygonal section; a sleeve slidably mounted on said polygonal portion of the member and having a rim-engaging shoe; a ring for holding said sleeve with its shoe in a rim-retaining position; and locking means for said ring.

8. An auto tire-tube carrier comprising a yoke; members associated with said yoke and formed to engage at least one tire tube rim, one of said members being provided with threaded and unthreaded portions; a sleeve mounted on the unthreaded part of said member and also formed to engage a tire tube rim; locking means including a plunger; with a ring threaded on said member and having notches for cooperation with the plunger of the locking means.

9. In an auto tire tube carrier the combination of a yoke; a plurality of members projecting from said yoke; a rim engaging shoe for each of certain of said members; two relatively movable shoes for another of the members, of which one shoe includes a portion slidable longitudinally on a polygonal portion of the member; a retaining element threaded on said latter member adjacent its polygonal portion; and a lock on said sleeve engaging said retaining element for normally preventing it from turning.

10. The combination in an automobile tire tube carrier of a plurality of radiating members, of which one has a portion of polygonal section; rim engaging means for said members including two relatively movable shoes on one member, one of said latter shoes being non-rotatably mounted on the polygonal portion of said radiating member; with locking means for normally preventing sliding of said shoe on said polygonal portion.

11. The combination in an auto tire tube carrier of a plurality of radiating members, of which one has a portion of polygonal section; relatively fixed rim-engaging elements on certain of said members; a relatively movable rim-engaging element sildable on and non-rotatably held by the polygonal portion of said member; with locking means for normally preventing sliding of said element on said member.

12. The combination in an auto tire tube carrier of a plurality of radiating members, of which one has a portion of polygonal section; relatively fixed rim-engaging elements on certain of said members; a relatively movable rim-engaging element slidable on and non-rotatably held by the polygonal portion of said member; with locking means for normally preventing sliding of said element on said member, including a ring threaded on the latter and a lock for preventing rotation of the ring when it is positioned to prevent sliding of said element on the polygonal portion of the member on which it is mounted.

13. The combination in a tire tube carrier of a plurality of rim-engaging structures; a member having a portion of polygonal section and a threaded portion; a sleeve slidably fitting said polygonal portion of the member and carrying one of the rim-engaging structures; a ring on the threaded portion of said member; and locking means for the ring.

14. The combination in a tire tube carrier of a plurality of rim-engaging structures; a member having a portion of polygonal section and a threaded portion; a sleeve slidably fitting said polygonal portion of the member and carrying one of the rim-engaging structures; a lock carried by the sleeve and including a projecting element; with a ring on the threaded portion of said member having teeth formed to cooperate with the projecting element of the lock to prevent rotation of the ring and sliding of the sleeve on the polygonal portion of the member.

15. An auto tire tube carrier comprising a yoke having rim-engaging members; an element adjustably threaded to said yoke and having a threaded portion and a portion of other than circular section; a rim-engaging member on said element; a sleeve slidable on but normally non-rotatably engaging the portion of other than circular section; a rim-engaging member for said sleeve; a ring on the threaded portion of the element; and locking means for normally preventing turning of the ring and sliding of the sleeve on its carrying element.

16. An auto tire tube carrier comprising a yoke having rim-engaging shoes; a member threaded to said yoke; a sleeve on said member; locking means on said sleeve; a sleeve-retaining element threaded on the member and normally held from movement by the locking means; with a rim-engaging shoe for the sleeve.

CHARLES JERABEK.